Oct. 7, 1958
D. McNICOLL
2,855,251
BEARING ASSEMBLIES
Filed June 27, 1957
2 Sheets-Sheet 1
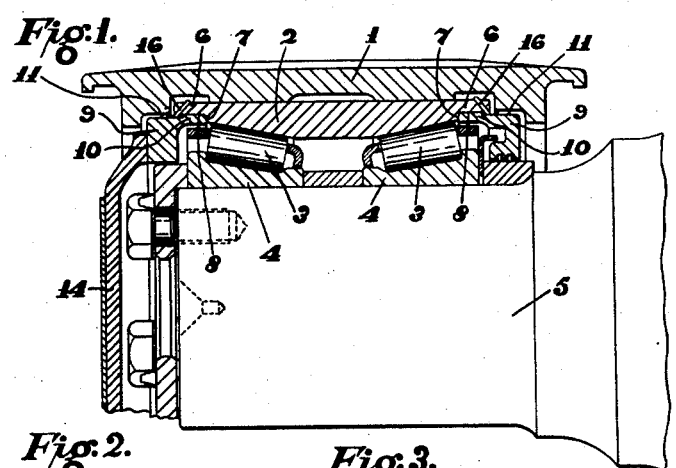
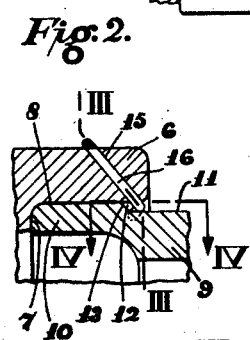
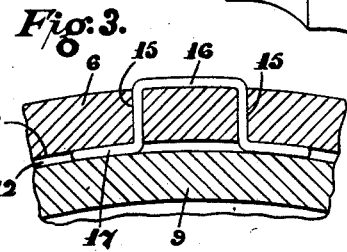
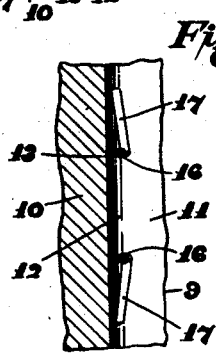
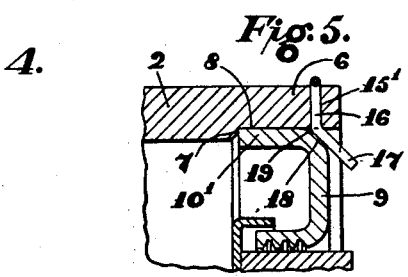
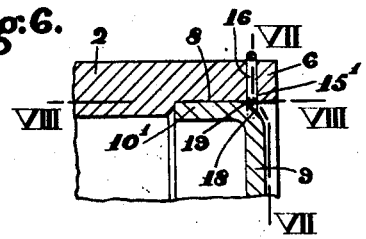
Inventor
David McNicoll
By
Patent Agent.

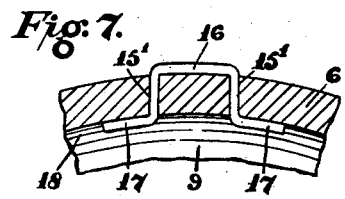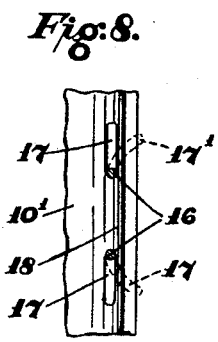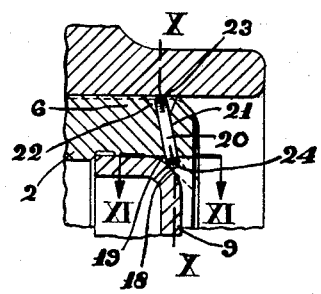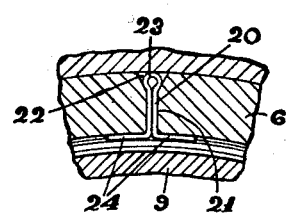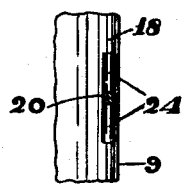

United States Patent Office 2,855,251
Patented Oct. 7, 1958

2,855,251
BEARING ASSEMBLIES
David McNicoll, Aston, Birmingham, England, assignor to British Timken Limited, Birmingham, England, a British company
Application June 27, 1957, Serial No. 668,443
Claims priority, application Great Britain August 20, 1956
6 Claims. (Cl. 308—187.1)

This invention relates to bearings, such as roller and ball bearings, in which a cover or sealing member is fitted into an open end of a sleeve or outer shell forming an outer part or housing of a bearing assembly, the peripheral surface of said cover or sealing member engaging a cylindrical interior surface of the sleeve or shell. The invention may be applied, for example, to a bearing assembly forming part of an axle-box.

An object of the present invention is to provide simple and effective means for retaining the cover or sealing member in position within the end of the sleeve or outer shell.

Another object is to provide simple and inexpensive means for enabling the cover or sealing member to be quickly and easily secured in position, or detached, as may be required.

A further object of the invention is to provide means for visually indicating when the cover or sealing member is displaced endwise in an outward direction from its normal position when in use.

According to the invention, a bearing comprises a sleeve or outer shell into an open end of which is fitted a cover or sealing member an axially-outward portion of which is spaced from the interior surface of the surrounding sleeve or shell by a circumferential space or clearance, the portion of the sleeve or shell which surrounds said space or clearance being provided with an aperture or apertures through which one or more retaining members are passed so as to contact the cover or sealing member, the portions of the retaining members which project inwardly from the sleeve or shell being bent or deflected in a direction around the circumference of the cover or sealing member and also being pressed into the circumferential space or clearance so as to prevent or resist outward movement of the cover or sealing member relatively to the sleeve or shell.

The outer portion of the cover or sealing member may be curved or inclined away from the interior surface of the sleeve or shell to provide an annular space or clearance the radial depth of which progressively decreases in an axially inward direction, said curved or inclined portion being so positioned in relation to the aperture or apertures in the sleeve or shell that the ends of the retaining member or members, when the latter are inserted into said aperture or apertures, engage the same, and are thereby deflected axially outwards, said end portions being pressed into the converging space or clearance so as to co-operate with the curved or inclined portion of the cover or sealing member in order to exert a wedging action against axial outward movement of said member.

Figure 1 of the accompanying drawings is a longitudinal section through an axle-box assembly showing the invention applied to the securing of end covers within the ends of a sleeve or shell constituting the outer race member of a tapered-roller bearing.

Figure 2 is a fragmentary sectional view, on a larger scale, through the right-hand end of the sleeve and corresponding cover.

Figure 3 represents a section on line III—III, Figure 2.

Figure 4 is a horizontal sectional view taken on line IV—IV, Figure 2.

Figure 5 is a fragmentary vertical section view of a modified form of the invention, showing the retaining member after being inserted through the sleeve and deflected by the end of the cover.

Figure 6 is a similar view to Figure 5, but shows the ends of the retaining member pressed inwards into the space between the sleeve and cover.

Figure 7 is a vertical section on line VII—VII, Figure 6.

Figure 8 is a sectional plan corresponding to line VIII—VIII, Figure 6.

Figure 9 represents a vertical section of another modified form of the invention.

Figure 10 is a transverse section corresponding to line X—X, Figure 9.

Figure 11 is a section on line XI—XI, Figure 9.

Referring to Figures 1 to 4 of the drawings, the axle-box assembly shown in Figure 1 comprises an outer casing or stirrup member 1 resting on a sleeve or shell 2 constituting an outer race member and housing for containing and co-operating with axially-spaced tapered rollers 3, which run upon inner race members 4 on the axle 5. The sleeve 2 is provided at each end with an extension part 6 which projects axially endwise beyond the rollers 3, and each said extension part 6 is counterbored to provide an annular outwardly-presented interior shoulder 7, the portion of the extension outwards of this shoulder having a cylindrical interior surface, at 8. Fitted into the said counterbored sleeve extension 6, up to the interior shoulder 7 thereof, is an annular end cover or sealing member 9. This cover or sealing member 9 is of approximately L-shape in cross-section and it has, at its inner end, a cylindrical portion 10 which closely engages the cylindrical interior surface of the sleeve extension 6. The outer peripheral portion of the cover 9 is, however, of reduced exterior diameter, as at 11, such reduced diameter extending inwards to a point beneath the sleeve extension 6 which thus extends over and overhangs said reduced diameter so as to provide a shallow annular space or clearance 12 between the sleeve extension 6 and the reduced part 11 of the cover, the inner end of said space or clearance 12 being of curved form, as at 13.

At the outer end of the axle-box the annular cover or sealing member 9 is closed by a detachable inspection plate 14 secured to the outer face of said member 9, as by screws (not shown), so that the cover member 9 with the inspection plate 14 constitutes an end seal for the bearing.

In order to retain each cover member 9 in place, the wall of the counterbored sleeve extension 6 is provided, at one, two or more positions around its circumference, with a pair of spaced parallel holes 15, which may be inclined as shown, and which receive a U-shaped wire retaining member in the form of a staple 16, being made of copper, brass or other similar ductile material. The holes 14 are so positioned that their inner ends open into the annular space 12, and each U-shaped staple is inserted from the outside, through the holes 14 so that the staple legs are received firmly one by each of the two said parallel holes, and so that the protruding end portions 17 of the legs contact on, and are spread laterally away from one another by, the cylindrical surface of the reduced part 11 of the cover 9, being caused to extend circumferentially around the said surface, within the annular space 12. The said ends of the legs are at the same time, or by a subsequent operation, pressed axially rearwards as far as possible into the said space 12, as indicated in Figures 2 and 4.

Any tendency of the cover to move axially outwards will be effectively resisted by the retaining member or members, but the cover member 9 can readily be separated from the sleeve 2, when required, by cutting, with a chisel or similar tool, the staple legs where they emerge from the inner ends of the holes 15.

If desired, the exterior cross-bar, which connects the legs of the staple, may be received in a groove (not shown) provided in the exterior surface of the sleeve extension 6 and connecting the outer ends of the two holes 15, so that the said cross-bar will lie flush with, or sunken beneath, the said exterior surface of the sleeve extension.

According to the modification shown in Figures 5 to 8, the outer end portion of the cover member 9, instead of being reduced in diameter, is formed with a curved radiused corner 18 joining, and merging into, a flat end face and the peripheral surface of cylindrical portion $10^1$ which engages the cylindrical interior surface 8 of the extension 6 of sleeve 2. The inner end of the cover member 9 abuts the shoulder 7 of the sleeve, and the extension 6 projects axially beyond the curved corner 18 of the cover member so as to provide an outwardly-presented substantially V-shaped circumferential space or clearance 19 between the sleeve extension 6 and the end cover member 9. Holes $15^1$ for receiving a staple-like retaining member 16 are provided in the sleeve extension 6 at positions such that their inner ends open into the space or clearance 19 immediately over the curved corners 18 of the cover member, these holes $15^1$ being either vertical, as shown, or inclined as in Figures 1 to 4.

Each staple 16 is inserted into the holes $15^1$ so that the outer ends of the leg portions impinge on, and are deflected and bent axially outwards by, the curved corner 18 of the cover member 9, as shown in Figure 5. The protruding end portions 17 of the legs, which are of a length greater than the axial distance from the end face of the cover 9 to the apertures $15^1$, are spread apart laterally and pressed into the space or clearance 19 so as to take the position shown in Figure 6, said end portions 17 pressing against the curved corner surfaces 18 and co-operating therewith to wedge the sleeve extension 6 and the cover member 9 against relative separation.

If the cover member 9 should be accidentally displaced endwise in an outward direction whilst the bearing is in use, the outward movement of the cover member will cause a compressive or shearing force to be applied to the inner faces of the bent portions 17 of the staple legs at the places where the said legs leave the holes $15^1$ in the sleeve extension, causing each of the legs to be elongated at the side engaged by the cover member. Since the staple is held securely in the holes and the elongation is at one side only of each staple leg, the said compressive or shearing force causes the end portions 17 of the staple legs to curve outwards in a direction away from the shoulder 7, into a position such as indicated by broken lines $17^1$ in Figure 8. The outwardly-pointing legs then serve to indicate visually that the cover member is tending to become displaced.

In the further modification shown in Figures 9 to 11, the arrangement is similar to that of Figures 5 to 8, but a split cotter pin 20 is used instead of a staple, said pin being inserted through a single hole 21, which may be inclined as shown or vertical, provided in the extension 6 of sleeve 2 so that its lower end opens into the converging space or clearance 19 between the rounded corner 18 of cover member 9, and the interior surface of the overhanging sleeve extension 6. The outer end of the hole 21 may be recessed at 22 to receive the head 23 of the pin. When the pin 20 is thus inserted through the hole 21 its end portion will be deflected and bent outwards by impingement on the rounded corner 18 of the cover, as indicated by broken lines in Figure 9 and the legs or branches 24 are then spread apart laterally and pressed into the space 19, so as to co-operate with said curved corner 18 to wedge the cover member 9 in position.

In Figures 5 to 11, the outer corner of the cover member may be inclined or bevelled instead of being curved.

Although the invention has been described in connection with a bearing assembly in which the end cover or sealing members are fitted within the ends of a sleeve which also forms the outer race member of the bearing, the invention is equally applicable in cases where the cover members are fitted into a sleeve which is separate from the outer race member and which forms a housing for one or more such separate outer race members.

I claim:

1. A bearing assembly comprising a sleeve enclosing rolling bearing elements, a cover member fitted in an open end of said sleeve said cover member having an axially-outward portion spaced from the interior surface of the sleeve by a circumferential space and at least one aperture being provided through the portion of the sleeve surrounding said space, and at least one retaining member passed through said aperture so as to contact the cover member, the portion of the retaining member which projects from the interior of the sleeve being bent in a direction around the circumference of the cover member and also being pressed into the circumferential space so as to resist outward axial movement of the cover member relatively to the sleeve.

2. A bearing assembly comprising a sleeve enclosing rolling bearing elements, a cover member fitted in an open end of said sleeve and having its outer portion diverging away from the interior surface of the sleeve to provide an annular space the radial depth of which progressively decreases in an axially inward direction, at least one aperture being provided through the end portion of the sleeve at a position such as to open into the annular space; and at least one retaining member inserted into the aperture in the sleeve to engage the diverging portion of the cover member, the inner end of said retaining member being bent in a circumferential direction around said portion of the cover member and also being pressed in the axial direction of the bearing into the annular space so as to exert a wedging action against axial outward movement of the cover member.

3. A bearing assembly comprising a sleeve enclosing rolling bearing elements and having at least one aperture in the wall of an open end portion thereof and also having an interior shoulder situated inwards of said aperture, a cover member having a cylindrical portion fitted within said open end of the sleeve and abutting the interior shoulder and also having an outer portion of reduced external diameter which is overhung by the sleeve end portion to provide an annular space into which the aperture in the sleeve opens, and at least one retaining member inserted into said aperture to engage said reduced portion of the cover member, the inner end of said retaining member being bent in a circumferential direction around said reduced portion of the cover member and also being pressed in an axial direction into the inner portion of the annular space.

4. A bearing assembly as claimed in claim 1, wherein at least a pair of circumferentially spaced apertures are provided in the sleeve and the retaining member consists of a wire staple the legs of which are inserted respectively into said apertures and have their ends spread apart laterally around the cover member and pressed into the circumferential space between the sleeve and cover member.

5. A bearing assembly as claimed in claim 1, wherein the retaining member conists of a split cotter pin inserted through the aperture and the legs of which are spread laterally around the cover member and are pressed into the circumferential space between the cover member and sleeve.

6. A bearing assembly as claimed in claim 2, wherein the inwardly projecting end of the retaining member is of a length greater than the distance between the end face of the cover member and the aperture through which the retaining member is inserted.

References Cited in the file of this patent

UNITED STATES PATENTS

| 1,931,871 | Large | Oct. 24, 1933 |
| 2,056,946 | Ankeny | Oct. 13, 1936 |